United States Patent
Saska et al.

(10) Patent No.: US 9,374,766 B2
(45) Date of Patent: *Jun. 21, 2016

(54) DYNAMIC CONTROL OF CELL RESELECTION PARAMETERS

(71) Applicant: AT&T Mobility II LLC, Atlanta, GA (US)

(72) Inventors: David Saska, Chester Springs, PA (US);
Louis Ficarra, Oakland, NJ (US);
Kaushik Gohel, Atlanta, GA (US);
Alain Ohana, Aventura, FL (US)

(73) Assignee: AT&T MOBILITY II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/722,525

(22) Filed: May 27, 2015

(65) Prior Publication Data

US 2015/0264630 A1    Sep. 17, 2015

Related U.S. Application Data

(63) Continuation of application No. 13/048,545, filed on Mar. 15, 2011, now Pat. No. 9,137,733.

(51) Int. Cl.
*H04L 12/26*    (2006.01)
*H04W 48/06*    (2009.01)
*H04W 48/18*    (2009.01)
*H04W 48/20*    (2009.01)
(Continued)

(52) U.S. Cl.
CPC .............. *H04W 48/06* (2013.01); *H04W 28/08* (2013.01); *H04W 48/02* (2013.01); *H04W 48/18* (2013.01); *H04W 48/20* (2013.01)

(58) Field of Classification Search
CPC ....................................................... H04W 48/06
USPC ........................ 370/230; 455/561, 509, 67.11
See application file for complete search history.

(56) References Cited

U.S. PATENT DOCUMENTS

| | | | |
|---|---|---|---|
| 6,535,736 B1 * | 3/2003 | Balogh | ................. H04W 28/16 455/434 |
| 6,745,033 B1 | 6/2004 | Shah et al. | |
| 7,848,756 B2 | 12/2010 | Nader et al. | |

(Continued)

OTHER PUBLICATIONS

Office Action dated May 13, 2014 for U.S. Appl. No. 13/048,545, 53 pages.

(Continued)

*Primary Examiner* — Parth Patel
(74) *Attorney, Agent, or Firm* — Amin, Turocy & Watson, LLP

(57) ABSTRACT

Dynamic cell resource management in wireless networking. By way of example, user terminal access parameters can be dynamically modified based on changing load conditions at one or more cells of a wireless network. For instance, resource capacity of a wireless network cell can be monitored over time to identify a potential resource overload condition. If such a condition occurs, a load management algorithm can be executed that progressively restricts or de-restricts user terminal access parameters based on changing load conditions. In particular aspects, the load management algorithm can analyze relative cell load of neighboring cells to implement coordinated load sharing. By dynamically modifying user access parameters, traffic can be directed toward or away from cells operating at low or high capacity, respectively.

20 Claims, 11 Drawing Sheets

(51) Int. Cl.
*H04W 48/02* (2009.01)
*H04W 28/08* (2009.01)

(56) References Cited

U.S. PATENT DOCUMENTS

| | | | |
|---|---|---|---|
| 7,941,155 | B2 | 5/2011 | Ji et al. |
| 7,957,757 | B2 | 6/2011 | Celebi et al. |
| 8,364,157 | B2 | 1/2013 | Lee et al. |
| 8,510,801 | B2 * | 8/2013 | Majmundar ......... H04L 63/101 709/227 |
| 8,588,738 | B2 * | 11/2013 | Gholmieh ............. H04W 48/14 370/331 |
| 8,830,899 | B2 * | 9/2014 | Li ........................ H04L 43/067 370/315 |
| 2001/0016497 | A1 | 8/2001 | Al-Housami |
| 2001/0034235 | A1 * | 10/2001 | Froula ................. H04W 74/006 455/446 |
| 2002/0193104 | A1 | 12/2002 | Scherzer et al. |
| 2004/0127224 | A1 | 7/2004 | Furukawa et al. |
| 2004/0203806 | A1 | 10/2004 | Craig et al. |
| 2005/0107110 | A1 | 5/2005 | Vasudevan et al. |
| 2005/0130662 | A1 | 6/2005 | Murai |
| 2005/0164709 | A1 | 7/2005 | Balasubramanian et al. |
| 2006/0084443 | A1 | 4/2006 | Yeo et al. |
| 2006/0211440 | A1 | 9/2006 | Nomiya et al. |
| 2009/0023453 | A1 | 1/2009 | Hu et al. |
| 2009/0034452 | A1 | 2/2009 | Somasundaram et al. |
| 2010/0075665 | A1 | 3/2010 | Nader et al. |
| 2010/0099450 | A1 | 4/2010 | Lu et al. |
| 2010/0142450 | A1 | 6/2010 | Kangude et al. |
| 2010/0291956 | A1 * | 11/2010 | Iwamura ............... H04W 48/20 455/509 |
| 2010/0317352 | A1 | 12/2010 | Nakata |
| 2011/0230179 | A1 | 9/2011 | Lee et al. |
| 2011/0250891 | A1 | 10/2011 | Zou et al. |
| 2012/0040675 | A1 | 2/2012 | Otte et al. |
| 2012/0282968 | A1 | 11/2012 | Toskala et al. |
| 2012/0282979 | A1 * | 11/2012 | Ashraf .................. H04W 16/08 455/561 |
| 2012/0322386 | A1 | 12/2012 | Yi et al. |
| 2013/0044601 | A1 | 2/2013 | Wigren et al. |
| 2013/0229971 | A1 | 9/2013 | Siomina et al. |

OTHER PUBLICATIONS

Office Action dated Oct. 21, 2014 for U.S. Appl. No. 13/048,545, 44 pages.

* cited by examiner

DYNAMIC CONTROL OF CELL RESELECTION PARAMETERS

CROSS-REFERENCE TO RELATED APPLICATION

This application is a continuation of, and claims priority to, U.S. patent application Ser. No. 13/048,545, filed Mar. 15, 2011, and entitled "DYNAMIC CONTROL OF CELL RESELECTION PARAMETERS," the contents of which application are hereby incorporated herein by reference in their entirety.

TECHNICAL FIELD

The present application relates generally to providing load management functionality in wireless communications, and, more specifically, to providing dynamic control of terminal access parameterization to facilitate load sharing or load management to protect a wireless network infrastructure from resource overload.

BACKGROUND

In conventional wireless communications, a radio access network will have hardware configured to exchange wireless signals with mobile terminal devices. The radio access network generally covers a geographic area that is subdivided into smaller regions served by central hardware components. The basic unit of subdivision is the network cell, which generally covers an area over which a base station can reliably receive signals from, and transmit signals to, the mobile terminal devices within the network cell. Although various conditions can change a cell size or base station signal strength, such as transmit power, interference, signal reflections or scattering off of physical structures or landscape (buildings or mountains, for instance), the network cell will always be the unit of subdivision employed in wireless networks.

Wireless transmission hardware typically comprises a transmitter coupled with a signal modulator and signal processor, as well as a receiver coupled with a signal demodulator and receive processor. Radio frequency bandwidth allocated to a network cell, processor capacity, power, memory, and the like are all resources employed to facilitate the wireless signal exchange. Like most resources, a physical limit on the number of terminals, or the amount of traffic that can be handled by a network cell at a given time is determined by those resources. The relationship between available resources and available cell capacity is direct; that is, as fewer wireless resources are available in serving terminals capacity of the cell decreases. Likewise, as more resources are available, capacity increases.

One design constraint involved in wireless networking is load balancing. Although a typical network cell size can be determined by the performances of the base station, the number of terminals within the cell is completely independent of that range. A particular problem arises when the number of terminals attempting to obtain service from a cell is far greater than the physical resources of the base station.

One mechanism to serve high population densities (with large numbers of access terminals) is to increase the amount of hardware resources within a given cell. In some instances, a wireless tower might have several wireless transceivers, each with separate hardware resources. In some cases, the wireless transceivers can be aimed in a particular direction, or sector, of the cell, enabling multiple wireless transceivers to serve respective sectors of the cell. This can multiply the signal resources (each sector having substantially all signal bandwidth utilized by the cell) as well as hardware resources (multiple transceivers having multiple processors, memory, etc.) available to serve higher terminal densities within the cell.

In geographic regions where high terminal density is relatively constant, adding additional hardware to cells of those regions can be an efficient way to multiply wireless network resources. Where population density is not constant, and particularly where it can change drastically, however, simply adding hardware is not an efficient mechanism for serving network traffic. Unfortunately, this is a relatively common occurrence. Office buildings, for instance, generally have many times the human population density (and terminal density) during business hours than outside them. But even more lopsided terminal density can exist. Stadiums, for instance, can cause dozens of thousands of people to aggregate in a relatively small area (generally smaller than a network cell), with dozens of thousands of terminals. Because these events last only for a few hours, and on sporadic occasions, such events cause a huge spike in terminal density that is not otherwise observed in a given network cell. The circumstances can make network resource planning very difficult.

Wireless hardware installations are more or less permanent (relative to changes in terminal population density). Accordingly, it may be cost prohibitive to install sufficient wireless transceivers to accommodate peak population density, for widely divergent terminal population densities. On the other hand, lesser hardware installations can become quickly overloaded when terminal density exceeds resource capacity. A resource overload condition can cause unpredictable wireless service, including dropped calls, service outage, or even large scale call failures within those regions. Because consumer satisfaction is an essential aspect in the competitive field of wireless communication services, existing research and development is directed toward avoiding these problems in general, and particularly for non-constant population densities.

The above-described deficiencies of today's wireless communications systems are merely intended to provide an overview of some of the problems of conventional systems, and are not intended to be exhaustive. Other problems with the state of the art and corresponding benefits of one or more of the various non-limiting embodiments may become further apparent upon review of the following detailed description.

DETAILED DESCRIPTION

Figure 1:
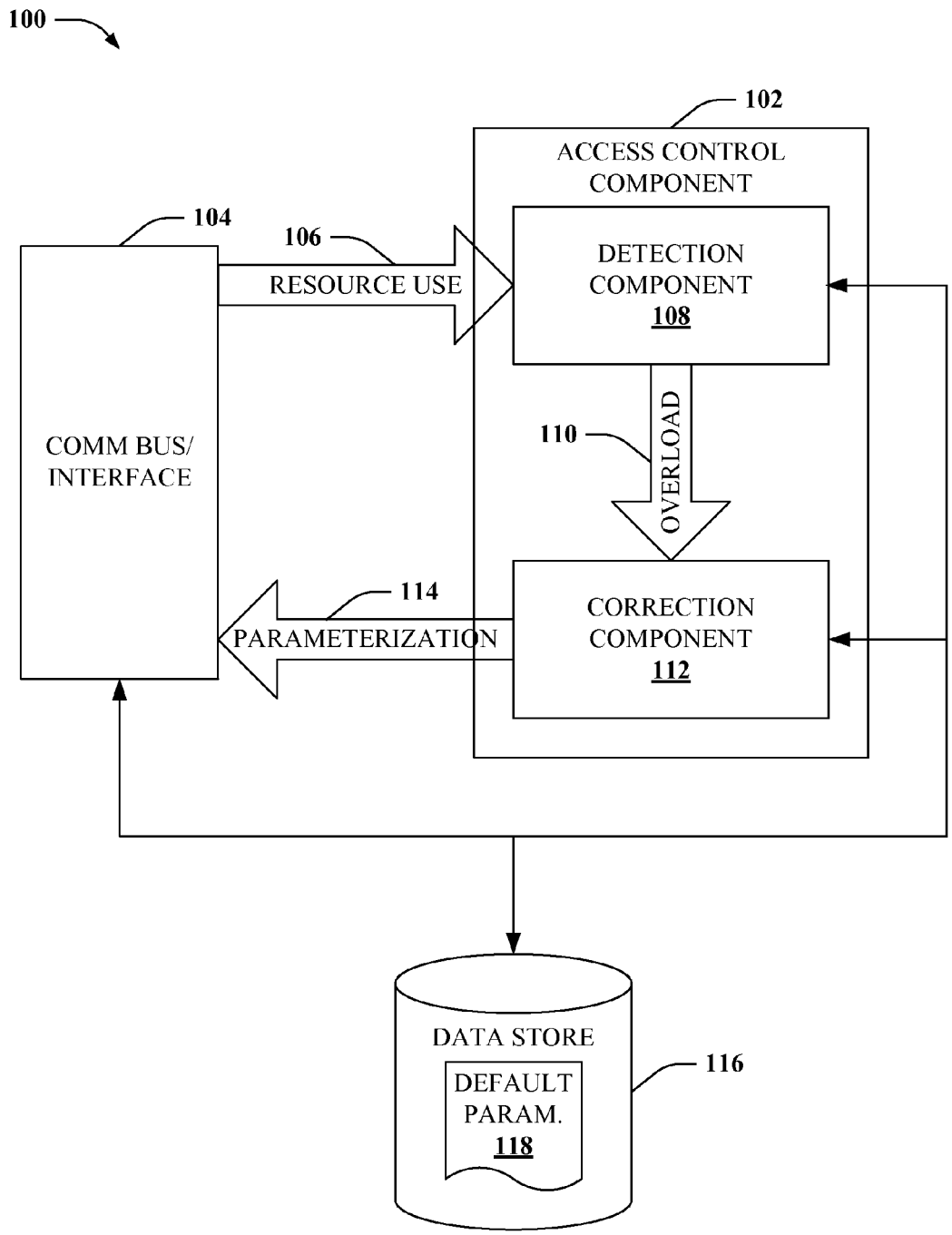
FIG. 1 is a block diagram of a sample system for providing dynamic access control in wireless communication according to aspects of the subject disclosure.

The various embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments may be practiced without these specific details. In other instances, well-known structures and devices are shown in block diagram form in order to facilitate describing the various embodiments.

As used in this application, the terms "component," "module," "system", or the like can refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the various embodiments may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications may be made to this configuration without departing from the scope or spirit of the various embodiments.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the terms to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

The subject matter disclosed herein, in one aspect thereof, provides for dynamic load management in wireless networking. Resource capacity of a wireless network cell can be monitored over time to identify a potential resource overload condition. If such a condition occurs, a load management algorithm can be executed that tightens user terminal access parameters within the network cell. By tightening user terminal access parameters, fewer terminals will attempt to camp on or register on the wireless network cell, potentially freeing up wireless resources and resource capacity.

According to an aspect, the load management algorithm can progressively tighten terminal access parameters as resource utilization at the network cell nears capacity. If current resource capacity exceeds a threshold of resource consumption load management is activated. A level of loading is established based on the degree to which current capacity exceeds the threshold of resource consumption. Terminal access parameters can be set commensurate with this level of loading. If the current resource capacity drops below the threshold of resource consumption, the load management algorithm can be terminated, and terminal access parameters restored to default values.

In other aspects of the subject disclosure, a mechanism for balancing load among multiple network cells is provided. Resource capacity of a plurality of network cells can be aggregated and analyzed to determine a level of resource consumption for respective network cells. Reselection offset parameters for respective network cells can be modified based on the analysis, biasing terminals in favor of lightly loaded cells, and against heavily loaded cells. In one aspect, light or heavy loading can be determined relative to predetermined resource consumption levels. In another aspect, light or heavy loading can be determined relative to the resource consumption of other cells. In yet another aspect, a combination of the foregoing is provided.

Once reselection offset parameter values are determined, these values are distributed to the cells, and from there to terminals within those cells. Heavily loaded cells can then implement load management algorithms as mentioned above to attempt to reduce resource consumption. Further, a level of loading for neighboring or co-located cells can be factored into load management algorithms at a given cell, to avoid biasing terminals off of one heavily loaded cell onto others. Where excessive loading is identified over most or all cells in a region, a hard cap can be implemented on the number of terminals given access to respective cells, to ensure that adequate service is provided at least to those terminals currently served by the network.

With reference to the drawings, FIG. 1 illustrates a block diagram of an example system 100 configured to provide dynamic user terminal access control in wireless communication. System 100 comprises an access control component 102 configured to mitigate loading in a cell of a wireless network (not depicted, but see FIG. 4, infra). When a wireless network cell becomes highly congested, wireless signal resources, including bandwidth, as well as hardware processing resources, such as data processors, memory, and the like, become heavily utilized. If traffic demand exceeds the capacity of the network cell problems with wireless service can result. These problems include call drops, lack of service, and even catastrophic reduction in system accessibility. The latter result can occur as a consequence of wireless interference caused by increased terminal demand, or as a result of an overload in processing capability of the resource allocation function.

To mitigate or prevent the problems associated with heavy traffic demand, access control component 102 is configured to identify a potential overload condition, and to progressively restrict terminal access to a network cell. The greater the level of loading over a threshold load, the greater the restriction. As the loading decreases, the terminal access restriction can be reduced, and eventually restored to default access. In one aspect, access control component 102 can monitor network cell load passively, until the level of loading meets or exceeds the threshold load. Likewise, if the level of loading drops below the threshold load, access control component can terminate terminal access restriction, and once again passively monitor network cell load to identify subsequent potential overload conditions.

Access control component 102 is communicatively coupled with a communication bus or communication interface 104 (referred to hereinafter as comm interface 104). Comm interface 104 can be a component of a wireless operator's network, a component of a radio access network (RAN), or a third party entity communicatively coupled with the wireless operator's network or RAN (e.g., see FIG. 6, infra). Accordingly, comm interface 104 can query or otherwise be sent current resource consumption information from the operator's network, pertaining to at least one cell of a wireless network. The current resource consumption information is forwarded to access control component 102 in a resource utilization message 106. The resource utilization message 106 is analyzed by a detection component 108 that identifies a potential overload condition for the cell of the wireless network, caused at least in part by user terminal congestion within the cell. If the potential overload condition is identified, detection component 108 forwards an overload message 110 to a correction component 112.

Detection component 108 can be configured to identify the potential overload condition deterministically, or by inference, according to various analysis techniques. In one aspect, for instance, detection component 108 can measure a level of loading for the cell based on traffic or access congestion. In this instance, the level of loading can be calculated from a number of terminals currently served by the cell, or an amount of traffic utilized by the terminals (e.g., total bandwidth, total data rate, etc.), or the like. In this case detection component 108 can infer a level of loading based on the number of terminals or amount of traffic, for example as a percentage of a maximum number of terminals or amount of traffic stored as a default parameter 118 in a data store 116 communicatively coupled with access control component 102.

In another aspect, the potential overload condition can be identified deterministically based on other default parameters 118. In this aspect, the current resource consumption information might represent an amount of processing resources currently consumed by terminals, an interference level observed within the cell, or the like. This current resource consumption information can be compared with a threshold resource consumption. If the current resource consumption meets or exceeds the threshold resource consumption, the overload condition is determined and overload message 110 is triggered. Further, detection component can quantify a level to which the current resource consumption exceeds the threshold resource consumption, if applicable, and determine a level of loading, which can be stored as a value in data store 116. This level of loading can be utilized to establish an initial amount of terminal access restriction by access control component 102, which can be progressively (e.g., incrementally) increased or decreased as the level of loading increases or decreases, respectively.

Correction component 112 receives the overload message 110 from detection component 108. In response, correction component 112 triggers load management functionality to effect the terminal access restriction mentioned above. This load management functionality can, in some aspects of the subject disclosure, be implemented by tightening access control parameters employed by terminals in selecting a network cell to camp on or register with. For instance, load management can comprise increasing a minimum signal strength parameter (e.g., a Qrxlevmin parameter in a universal mobile telecommunications system [UMTS], or an analogous parameter in wireless network systems based on another technology or standard). Increasing this parameter causes terminals observing pilot or synchronization signals of the network cell below the minimum signal strength value to seek other network cells to camp on or register with, potentially reducing load on the network cell associated with access control component 102. As another example, load management can comprise increasing a minimum signal quality parameter (e.g., a Qqualmin parameter in a UMTS network, or an analogous parameter in a wireless network based on another technology or standard). Increasing this parameter causes terminals that measure the pilot/synchronization signals below a minimum signal quality value to seek other network cells to camp on or register with.

As discussed in more detail infra, other parameters can be manipulated to cause terminals to seek other network cells, such as parameters biasing terminals in favor of a particular cell, or biasing terminals against the cell associated with access control component 102. Still other parameters can be manipulated to cause terminals to seek network cells associated with a different network technology. For instance, an inter-radio access technology (IRAT) parameter that biases terminals toward or against a particular network technology (e.g., inducing a transfer from a 3G to a 2G or 4G network, or some other suitable variation thereof).

It is to be appreciated that the parameters described herein for reducing terminal access attempts to this cell is not exhaustive. Rather, other parameters similar or analogous to those described herein and known to one of skill in the art, or made known to one of skill in the art by way of the context provided herein are considered within the scope of the subject disclosure. In other aspects, load management functionality can be coordinated among multiple network cells, to mitigate one cell from excessively loading a co-located cell or a neighboring cell. In yet other aspects, load management functionality can be distributed among other resource management functions of a wireless network, for instance to avoid active session resource management from handing a terminal off to a cell that was avoided by the terminal as a result of access parameter restrictions implemented by access control component 102. These aspects are discussed in more detail infra.

In a particular aspect of the subject disclosure, correction component 112 can establish varying degrees of terminal access restriction. Particularly, a degree of terminal access restriction can be set commensurate with a level of loading determined by detection component 108. This level of loading can be obtained from data store 116 (or directly from detection component 108). Correction component 112 can employ a look-up table, association database, or other suitable mechanism for identifying a suitable level of terminal access restriction based on the level of loading. Further, similar mechanisms can be employed to identify suitable parameter values that correspond with the identified suitable level of terminal access restriction (e.g., a Qqualmin value, a Qrxlevmin value, a Qoffset value, and so on). Upon identifying suitable parameter values, correction component 112 outputs a parameterization message 114 containing these values to comm interface 104. Comm interface 104 can then forward these parameter values for distribution to terminals within range of the cell associated with access control component 102.

As described above, load management functionality can be implemented to mitigate or prevent resource overload of a network cell. This can help to avoid catastrophic system accessibility reduction caused by resource overload. It is worth noting that in particular aspects, the load management functionality is implemented via parameters involved in cell selection decisions employed by terminals. This can be a more advantageous way to implement load management, as compared with imposing a hard cap on the number of terminals given access to a cell, or simply dropping terminals. First, at least some of the cell selection parameters described herein involve signal strength or signal quality parameters. By tightening these parameters, terminals that observe poor signals from the cell are offloaded first, maximizing quality of service to terminals retained by the cell. A hard cap on the number of terminals may not be able to incorporate this type of discrimination, such that some terminals may receive poor service, whereas other terminals that could be well-served by the cell are rejected. Second, by progressively tightening access parameters, the cell can still be run at or near resource capacity. This results in efficient utilization of cell resources.

Figure 2:
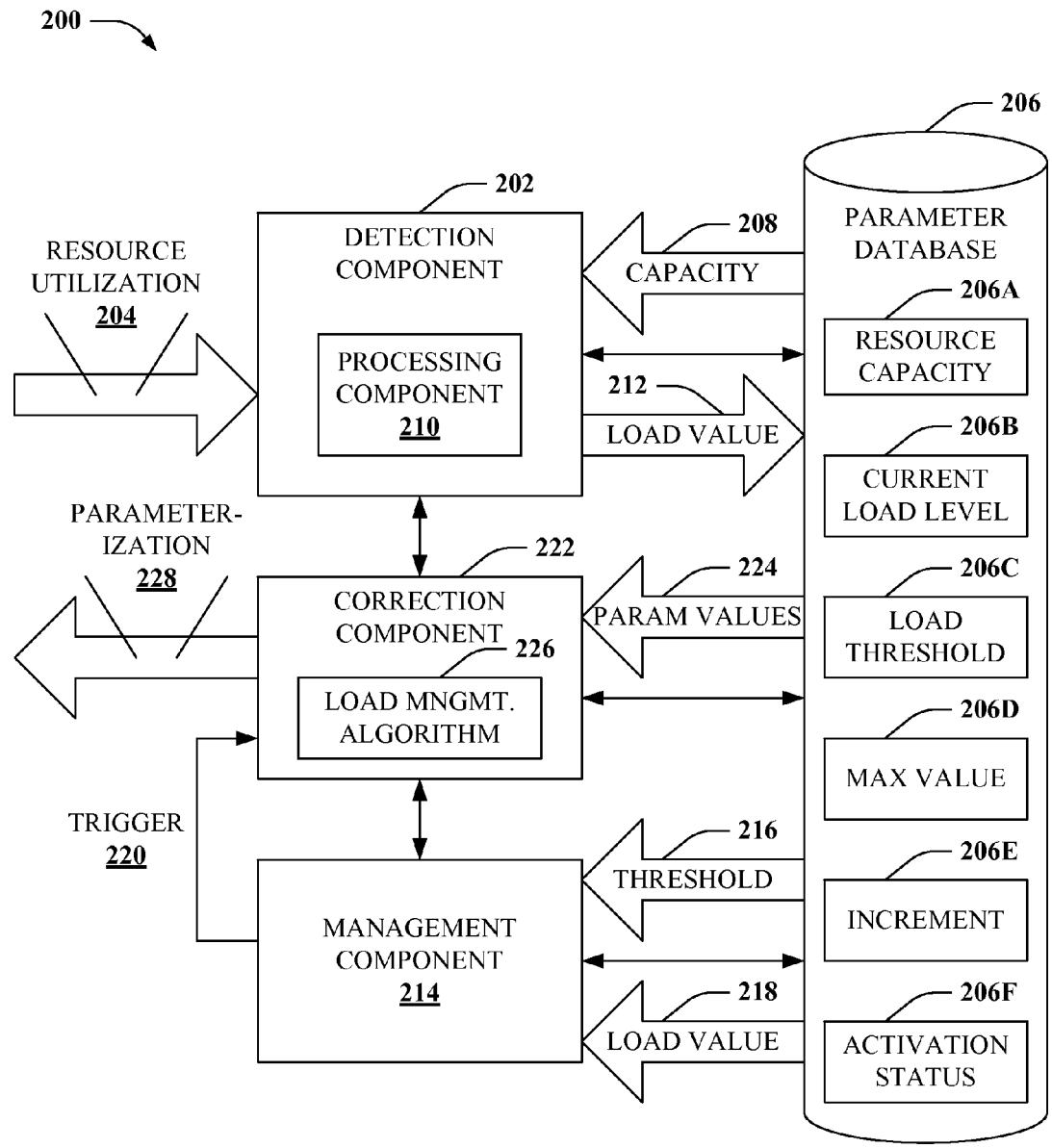
FIG. 2 depicts a block diagram of an example system that employs dynamic terminal access parameterization for load management according to some aspects.

FIG. 2 depicts a block diagram of a sample system 200 for providing resource management in wireless communications. System 200 can comprise a detection component 202 that receives a resource utilization message 204 comprising information pertaining to current cell load, or current cell resource consumption, for one or more cells associated with system 200. Upon receiving resource utilization message 204, detection component 202 can query a parameter database 206 that maintains a list of cell access parameters related to dynamic access control for the cell(s), and corresponding values for the cell access parameters. These values are stored in respective data locations 206A, 206B, 206C, 206D, 206E, 206F (referred to collectively as data locations 206A-206F) of parameter database 206. In response to the query, parameter database 206 provides a resource capacity message 208, which specifies resource capacity values for the cell(s). A processing component 210 is employed to compare the current cell load information to the resource capacity values, and determine a level of load for the cell(s) (respectively). The level of load is stored in a data location 206B of parameter database 206 via a load value message 212.

A management component 214 monitors the level of load value(s) for the cell(s) stored in data location 206B, through load value messages 218 received by management component 214 from parameter database 206. Upon identifying a change in the level of load, management component 214 queries parameter database 206 for threshold load values for a cell(s) associated with the changing level of load. The threshold load values are delivered to management component 214 in a threshold message 216. If a change in level of load associated with an overload condition is identified by management component 214 (whether increasing level of load or decreasing level of load), management component 214 sends a trigger 220 to a correction component 222, to re-calculate load parameters associated with load management functionality. In this manner, management component 214 can effectuate progressive restriction or de-restriction based on contemporaneous changes in the level of load.

In addition to the foregoing, management component 214 can terminate load management functionality where appropriate. For instance, if the level of loading drops below a load threshold value, management component 214 can update an activation status parameter stored in data location 206F to negative, and issue a trigger 220 that can cause correction component 222 to go inactive. Subsequently, management component 214 continues to monitor the current level of load on the cell(s) updated by detection component 202. However, no additional load management functionality is conducted by system 200 until the level of load meets or exceeds the load threshold value. If this latter condition is identified, management component 214 updates the activation status to positive and changes the activation status parameter in data location 206F to reflect this condition.

Upon receiving the trigger 220 from management component 214, correction component 222 acquires a parameter values message 224 from parameter database 206. The parameter values can include current load management parameter values, as well as default load management values associated with load management functionality. Examples can include max parameter values stored in a max value data location 206D of parameter database, as well as increment sizes stored in an increment size data location 206E of parameter database. The max parameter values, increment size values, as well as current level of load and load capacity information can be provided to a load management algorithm 226 executed by correction component 222 in response to trigger 220. Load management algorithm outputs updated terminal access parameter values as a parameterization message 228, which can be distributed to terminals in the cell(s) associated with the updated parameter values.

Figure 5:
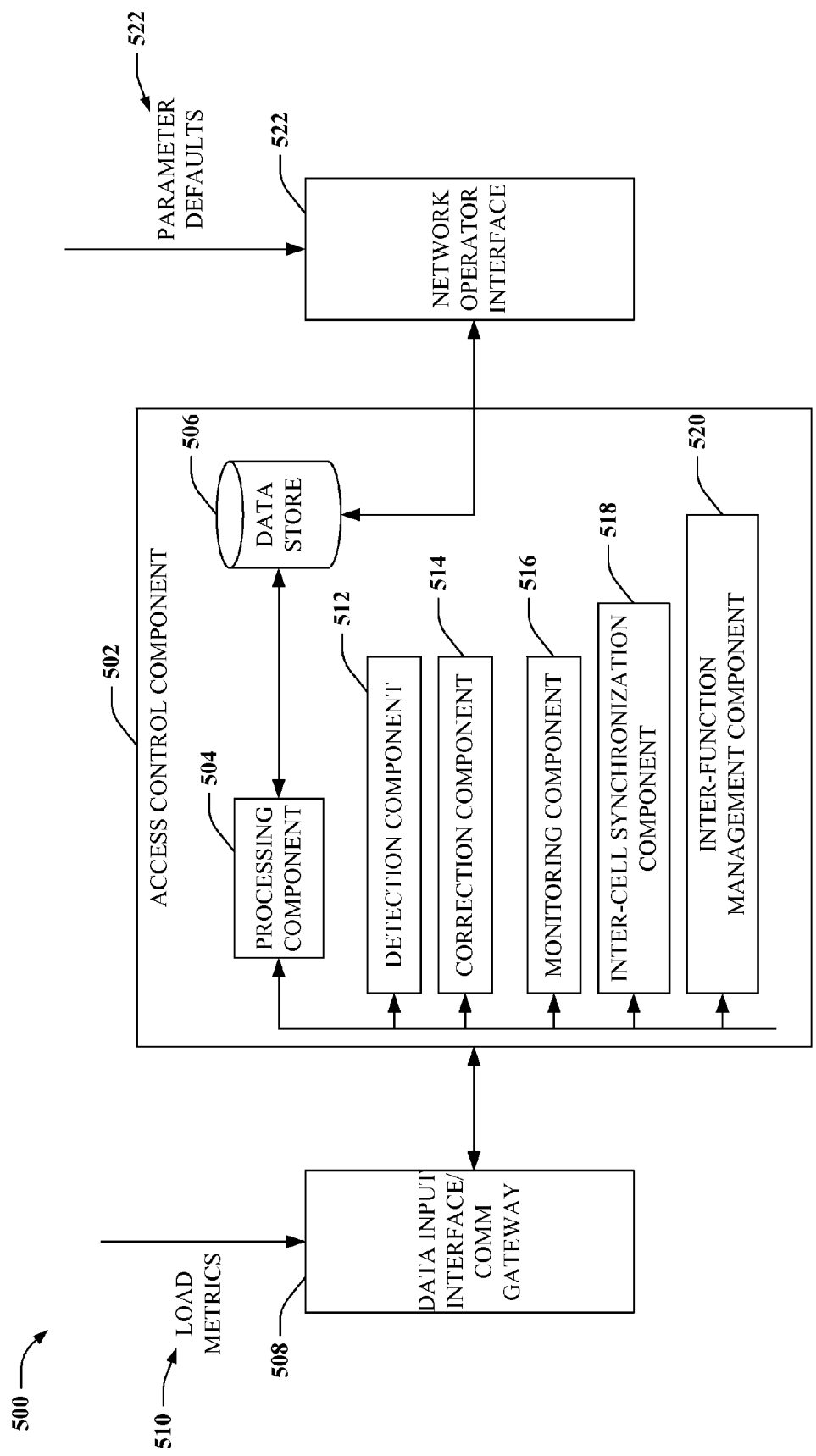
FIG. 5 depicts a block diagram of an example system that facilitates inter-cell resource management in conjunction with dynamic access control.

In a particular aspect of the subject disclosure, default parameter values stored in parameter database 206 can be modified by a network operator (e.g., see FIG. 5, infra). In this case, the network operator can modify the max value to which a minimum signal quality parameter or minimum signal strength parameter can be tightened, as well as default minimum signal quality or minimum signal strength parameters employed when no potential overload condition exists. Additionally, the network operator can modify the increments to which these parameters are adjusted in response to changes in level of load. Accordingly, the network operator can have control over how fast or slow terminal access restriction is implemented in response to potential overload conditions. This can provide a significant benefit to network operators, enabling variable control over load management functionality based on an anticipated change of terminal density. Thus, where a stadium or other large capacity structure is constructed near one or more cells of the operator's network, the operator could increase load management functionality in anticipation of highly changing terminal density that typically coincides with large-scale events.

Figure 3:
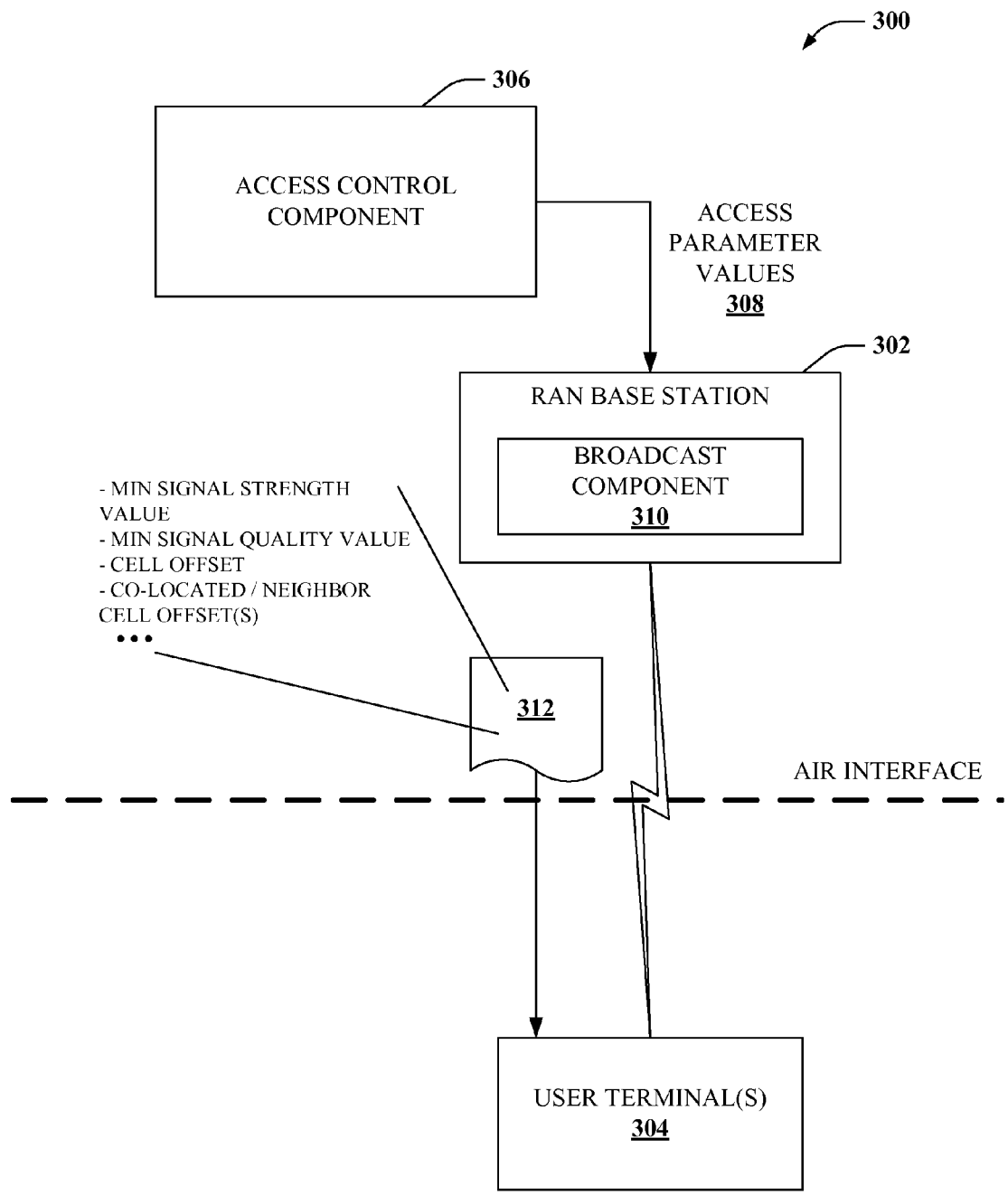
FIG. 3 illustrates a block diagram of a sample system for distributing terminal access parameter values to user terminals according to particular aspects.

FIG. 3 illustrates a block diagram of an example system 300 for distributing terminal access parameterization to user terminals operating within a cell of a wireless network, according to additional aspects of the subject disclosure. As described herein, progressive terminal access restriction can be employed to reduce a number of terminals that select a particular cell to camp on or register with. This can be implemented by modifying parameter values employed by a terminal in selecting such a cell. By tightening parameters associated with a cell, a number of terminals selecting the cell can often be reduced. Likewise, by loosening parameters associated with the cell, the number of terminals selecting the cell can often be increased.

System 300 can comprise a RAN base station 302 communicatively coupled with a set of user terminals 304 over a wireless air interface. It should be appreciated that the RAN base station can be associated with various types of mobile communication networks, including second generation (2G) networks, third generation (3G) networks, fourth generation (4G) networks, and so on, based on standards and functionality implemented for the RAN base station 302. Additionally, system 300 can comprise an access control component 306 configured to identify a potential overload condition within a cell of the RAN base station 302, and implement load management functionality to direct one or more of user terminals 304 to other cells if the potential overload condition is identified, as described herein. Although access control component 306 is shown as separate from RAN base station 302, the subject disclosure is not limited to this particular implementation. For instance, access control component 306 can be physically co-located with one or more wireless transceivers of RAN base station 302, in one implementation. In an alternative implementation, access control component 306 can be physically co-located with a RNC (not depicted, but see FIG. 6C, infra) associated with RAN base station 302. In yet another alternative implementation, access control component 306 can be a third party entity communicatively coupled with the RNC or with RAN base station 302, but not necessarily physically co-located therewith. In still another alternative implementation, access control component 302 can be located within an operator's network, or within a core network of a mobile communication technology. As yet another implementation, a combination of the foregoing implementations can be effectuated, for instance, where portions of access control component 306 are physically located in various places (e.g., some portions within RAN base station 302, others within or near the RNC, and others within the operator's network, or other suitable combinations or variations).

Upon identifying a potential overload condition (e.g., where resource consumption of a cell of RAN base station 302 exceeds a threshold level of total resource capacity), access control component 306 outputs a set of terminal access parameter values 308 configured to provide a level of reduction in user terminals 304 attempting to access RAN base station 302. As described herein, this level of reduction can be commensurate with a level of loading, or an amount of resource consumption over the threshold level of total resource capacity. In one aspect of the subject disclosure, RAN base station 302 employs a broadcast component 310 to wirelessly transmit access parameter values 308 to user terminals 304. As a particular example, the access parameter values can be included in a System Information Message 312 in a UMTS or LTE network, or an analogous message of another communication network technology. Example parameters and corresponding values can include a minimum signal strength value, a minimum signal quality value, a cell offset value for RAN base station 302, offset values for co-located or neighboring wireless transceivers within the RAN, or the like, or suitable combinations thereof.

In an alternative aspect, RAN base station 302 could unicast access parameter values 308 to one or more of terminals 304, either instead of or in conjunction with broadcasting these values. Unicast messaging can be employed, for instance, for user terminals 304 having difficulty receiving wireless messages from RAN base station 302. In this case, unicast signals can be transmitted at higher signal power, or transmitted with beamshaping techniques to the particular terminals, to reduce interference within the cell caused by high level broadcast signals. In one instance, a position(s) of particular terminals can be identified with location-based services (e.g., GPS positioning, network triangulation techniques, etc.), with the unicast message being transmitted to the identified position(s). In this manner, a higher degree of granularity can be implemented for generating access parameter values for particular terminals 304 (e.g., see FIG. 5, infra), and delivering those access parameter values to the particular terminals 304.

Figure 4:
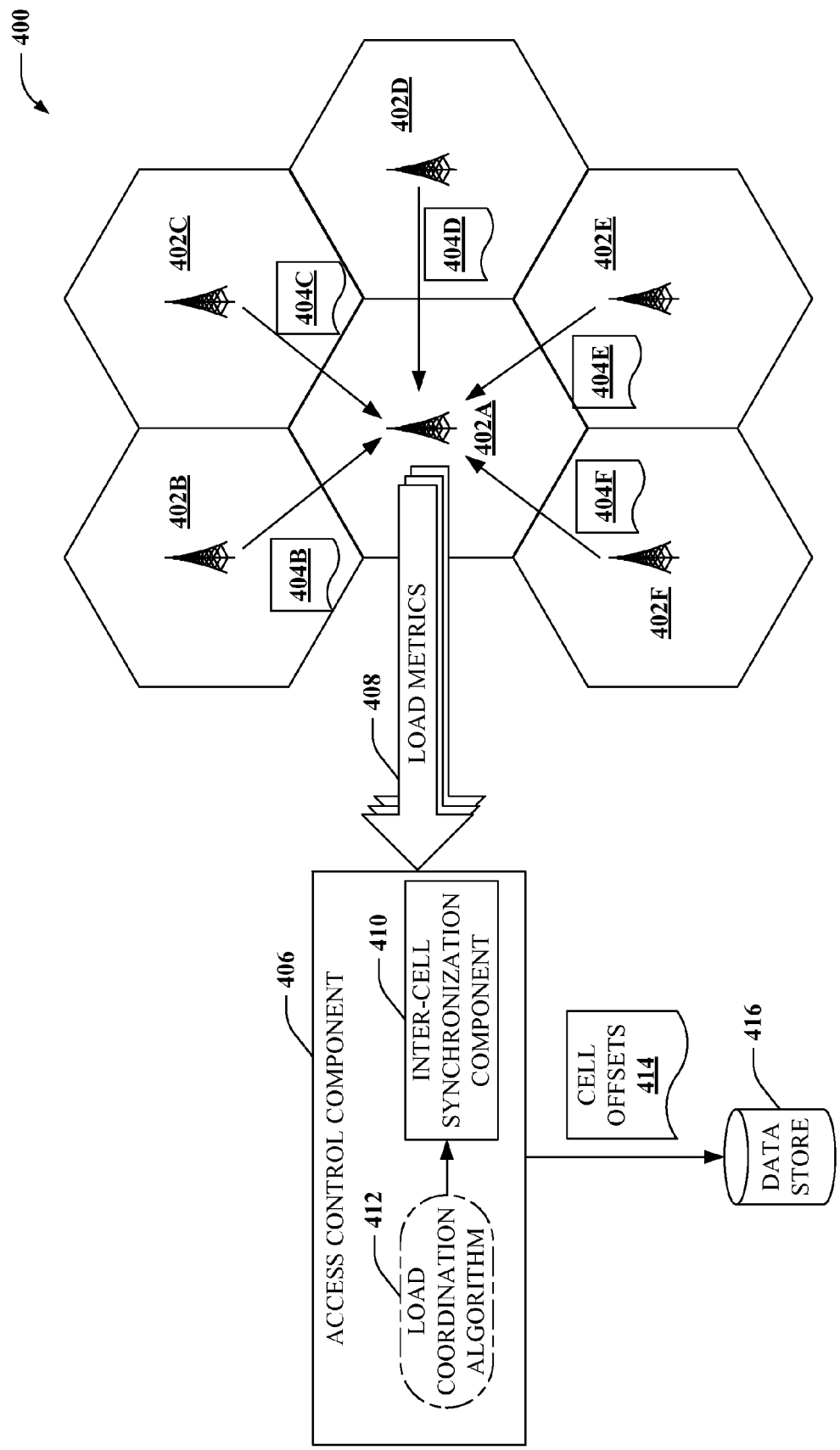
FIG. 4 depicts a block diagram of a sample system that provides inter-cell resource management according to still other aspects.

FIG. 4 depicts a block diagram of an example system 400 for providing inter-cell resource management associated with terminal load coordination in wireless communications. System 400 can comprise a set of cells, cell 402A, cell 402B, cell 402C, cell 402D, cell 402E, cell 402F (referred to collectively as cells 402A-402F) associated with respective geographic regions served by a wireless network. Each of cells 402A-402F includes one or more wireless transceivers for facilitating wireless communication with user terminals (not depicted) within or near the respective cells 402A-402F.

Each cell 402A-402F can be configured to analyze and compute a metric representing current resource load of the respective cells 402A-402F. The metric can be based on a number of terminals served by the respective cells 402A-402F, interference level within the cells 402A-402F, a level of hardware or signal resources currently consumed (or currently available) for each cell 402A-402F, or the like, or a suitable combination thereof. In one aspect, respective cell load metrics are transmitted from individual cells to a common location. In the example implementation depicted by FIG. 4, respective cells 402B-402F transmit their load metrics to cell 402A. However, other implementations are within the scope of the subject disclosure. For instance, cells 402A-402F can all transmit their respective load metrics to another such cell (402B-402F), to an RNC, or to another component of an operator's wireless network (or directly to access control component 406). In the case where load metrics are aggregated other than at access control component 406, and regardless of where these load metrics are aggregated, an aggregate of the load metrics is forwarded to access control component 406 in an aggregated load metric message 408. In the case where load metrics are forwarded to access control component 406 individually by respective cells 402A-402F, no aggregate load metric message 408 is required. Rather, individual load metric messages (408) can be sent instead.

Upon receiving the load metric message(s) 408, access control component executes an inter-cell synchronization component 410. Inter-cell synchronization component 410 employs a load coordination algorithm 412 configured to coordinate loading among wireless transceivers within cells 402A-402F. Coordinated loading can be implemented collectively for multiple transceivers co-located in any given cell 402A-402F, or for individual wireless transceivers of respective cells 402A-402F.

Based on the load metrics for respective wireless transceivers, load coordination algorithm is configured to determine a current level of loading with respect to respective threshold resource capacity values, stored in a data store 416. For instance, load coordination algorithm 412 can be configured to identify one or more of the wireless transceivers operating under resource capacity, and determine a level of resource availability for the respective one or more wireless transceivers. Alternatively, or in addition, load coordination algorithm 412 can be configured to identify one or more wireless transceivers operating above a threshold resource capacity (where the threshold resource capacity can be a single value, or separate underload/overload resource capacity metrics where a load metric between the respective capacity metrics is considered neutral). In either or both cases, load coordination algorithm 412 can calculate a level of operation over capacity or under capacity (or neutral capacity) for respective wireless transceivers of cells 402A-402F. Based on this calculation, load coordination algorithm establishes a load ranking for respective wireless transceivers. The load ranking can then be employed to generate network offload parameter values (e.g., a Qoffset parameter in the UMTS network, or similar or analogous parameters for networks operating on a different wireless technology) for respective wireless transceivers or cells 402A-402F thereof. The network offload parameters can be distributed to user terminals operating within the respective cells 402A-402F, to bias user terminal cell selection in favor of cells with low load ranking, against cells with high load ranking, or without bias for cells with moderate load ranking. In a particular aspect of the subject disclosure, the load ranking can also be incorporated into load management algorithms implemented by respective cells 402A-402F, as is described in more detail at FIG. 5, infra.

FIG. 5 illustrates a block diagram of an example system 500 for coordinated load sharing implemented in conjunction with load management algorithms described herein. System 500 can comprise an access control component 502 comprising a processing component 504 and data store 506. Processing component 504 can be employed to execute one or more load sharing algorithms or load coordination algorithms described herein. Processing component 504 can be employed by various other components of access control component 502 to execute these and other algorithms. Additionally, data store 506 can store default parameters associated with load sharing or load coordination, current load levels of respective cells, and the like, as described herein (e.g., see data store 416 of FIG. 4, parameter database 206 of FIG. 2, or data store 116 of FIG. 1, infra).

Access control component 502 can be communicatively coupled with a data input interface/communication gateway 508 (referred to hereinafter as data input interface 508), for receiving network data related to current load levels of network cells, and sending parameter values associated with load sharing or load management to the respective cells. Particularly, a set of load metrics 510 associated with respective cells of a wireless network are received at data input interface 508. These load metrics 510 can be received periodically, in one instance, or can be in response to a query for such metrics initiated by access control component 502. Load metrics 510 are forwarded to access control component 502 from data input interface 508 and can be stored in data store 506.

Upon receiving load metrics 510, a detection component 512 is executed that compares current load capacity (derived from load metrics 510) of cells of the wireless network to a maximum load capacity of respective cells. This maximum load capacity can be retrieved from data store 506. Further, detection component 512 can identify a potential overload condition for a cell(s) in response to the current load capacity of that cell(s) meeting a condition with respect to the maximum load capacity. Such a condition can include, for instance, meeting a threshold percentage of maximum load capacity, exceeding a predetermined number of terminal registrations, exceeding a predetermined amount of traffic or bandwidth, etc., upon available resources dropping below a threshold percentage of total resources, or the like. If an overload condition or a potential overload condition exists for any cells, detection component 512 determines a level of loading for such cell(s), stores the level of loading in data store 506, and triggers correction component 514 to initiate load management functionality of access control component 502. Additionally, detection component 512 can trigger inter-cell synchronization component 518 to initiate load sharing functionality of access control component 502, the results of which can be employed by correction component 514 in load management determinations.

Correction component 514 determines a suitable terminal access parameterization to address the overload condition as described herein. In addition, the determination can be based at least in part on relative loading of cells co-located with or neighboring a potentially overloaded cell, as established by inter-cell synchronization component 518. In one example, terminal access parameterization can incorporate the relative loading by establishing suitable offload parameters for respective cells that bias terminals toward cells with lower current resource consumption, or away from cells with higher current resource consumption. In one instance, this parameterization can incorporate IRAT parameters that bias terminal cell selection in favor of or against a particular wireless network technology observing low traffic congestion or high traffic congestion, respectively. The relative loading can be determined relative to respective current load metrics of other network technologies, or with respect to one or more loading thresholds, or both.

In addition to establishing offload parameter values for load management, correction component 514 can establish load management parameter values that can restrict or de-restrict terminal access decisions with respect to particular network cells. This degree of restriction/de-restriction and corresponding parameter values can be determined solely based on current load levels of those cells, or in relationship to current load levels of neighboring cells or co-located wireless transceivers. Thus, for example, in the former case, restriction/de-restriction parameterization can be implemented to bias terminals in favor of or against one particular cell based solely on the current level of loading associated with that cell (independent of the offload parameters). In the other case, the restriction/de-restriction parameterization can be implemented to reflect relative loading levels among different cells. The former case can be beneficial, for instance, where a large number of cells are heavily loaded, such that restricting terminal access parameterization in effect reduces terminals accessing many or all of the cells. Where load management parameterization involves signal strength or signal quality parameters, terminals observing poor signal strength or signal quality will be more likely to avoid accessing highly loaded cells. This has the ancillary effect of increasing a likelihood that good service can be provided for those terminals which are served, and decreasing a likelihood that those terminals which could otherwise be provided good service will be unable to be served.

Once correction component 514 establishes load management and load sharing parameter values for respective cells, values for these parameters are provided to data input interface 508 for distribution to respective cells and terminals thereof. So that terminal access parameterization can be dynamic and respond to changing load conditions with a network, a monitoring component 516 can be employed to monitor changes in load level values of cells stored in data store 506, and trigger correction component 514 to re-calculate parameter values if significant load level changes are detected. Monitoring component 516 can passively monitor changes to load levels stored in data store 506, or can send a query via data input interface 508 to acquire new load level data.

In additional aspects of the subject disclosure, access control component 502 can comprise an inter-state resource management component 520. Inter-state resource management component 520 can be configured to propagate changes in user terminal access parameterization to additional resource management functions of a wireless network associated with system 500. One example can include active mode resource management functions of the network. Active mode resource management functions are responsible for managing wireless resources for terminals engaged in an active call session (e.g., voice call or data call). These functions can cause network-directed handovers from one cell to another, for instance, to provide efficient support for the call session. However, these functions are often implemented independent of idle mode cell selection, which can result in terminals directed away from a cell as a result of terminal access decisions, being directed back to that cell once a call is in session. Inter-state resource management component 520 can distribute inter-state parameterization to such functions, or can provide parameters configured to modify or override such functions to respective active mode resource management entities. Thus, as an example, the inter-state parameterization deployed by inter-state resource management component 520 can cause active mode resource management functions to reduce a probability that a terminal is re-directed back to a cell during a call session if the terminal is directed away from the cell as a result of access terminal parameterization changes, or reduce a probability that the terminal is re-directed away from the cell during the call session if the terminal is directed toward the cell as a result of such changes. In a similar manner as described above, monitoring component 516 can trigger inter-state resource management component 520 to re-calculate and redistribute inter-state parameterization as a result of changes in load level stored in data store 506, or in another aspect, inter-state resource management component 520 can be triggered upon new access terminal parameterization output by correction component 514.

In one additional aspect of the subject disclosure, data store 506 can be communicatively coupled with a network operator interface 522. Network operator interface 522 can be configured to enable operator changes to default parameterization stored in data store 506, associated with progression restriction/de-restriction on terminal access attempts to network cells. In an additional aspect, network operator interface 522 can also enable operator changes to inter-state parameterization default values employed by inter-state resource management component 520 for synchronizing resource management functions of the wireless network. As one example, default parameterization that can be modified via network operator interface 522 can include a load threshold for activating or deactivating access terminal parameterization functions described herein. Additional parameters can include a load threshold(s) for activating or deactivating access terminal restriction, or thresholds for increasing/decreasing the access terminal restriction, a max value for a minimum signal quality or minimum signal strength parameters associated with user terminal access determinations, IRAT parameters associated with user terminal access determinations, respective number of value increments between respective default values and respective max values for cell/network selection parameters, respective size of value increments, or the like, or suitable combinations thereof.

Figure 6A:
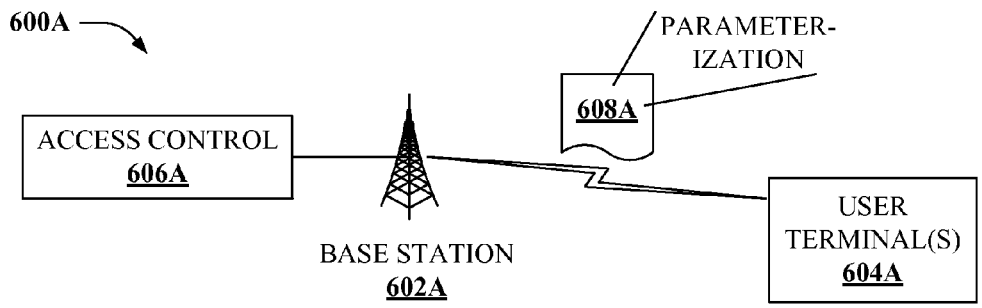
FIGS. 6A, 6B and 6C depict block diagrams of example implementations of various mechanisms for dynamic access control described herein.
Figure 6B:
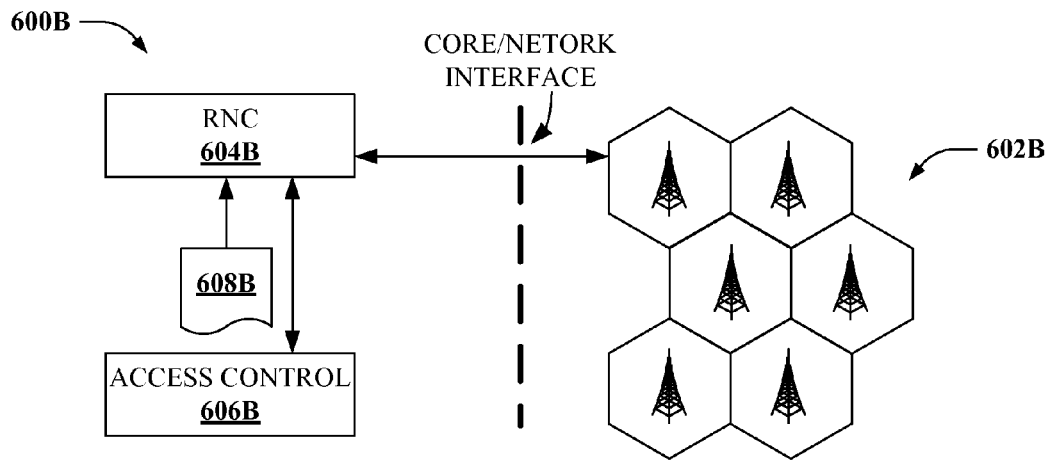
Figure 6C:
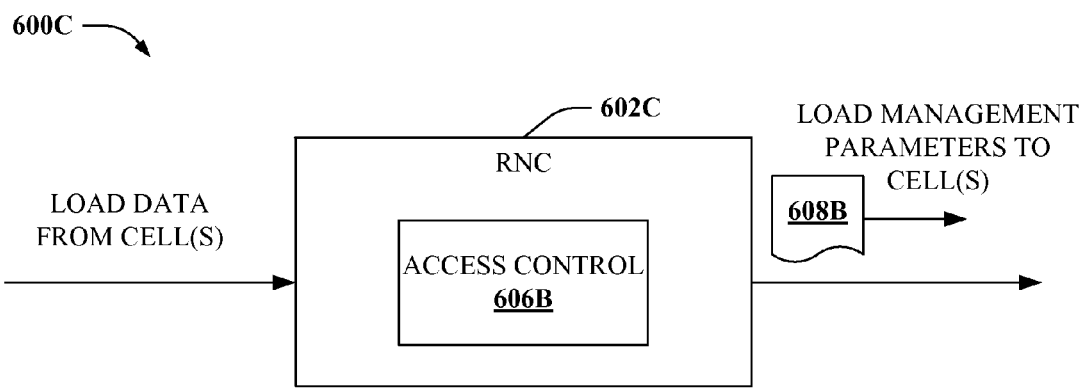

FIGS. 6A, 6B, 6C depict block diagrams of alternative implementations of dynamic access control management according to other aspects of the subject disclosure. FIG. 6A depicts a system 600A for load management in wireless communications according to one specific aspect. System 600A comprises a RAN base station 602A communicatively coupled over a wireless link with one or more user terminals 604A. In addition, RAN base station 602A is connected with an access control component 606A. Access control component 606A can be implemented as a sub-component of other software and hardware components of RAN base station 602A, or can be a separate hardware and software installation located on or near a radio tower of RAN base station 602A, and communicatively coupled therewith via a wired connection (e.g., Ethernet, fiber optic cable, twister copper pair, and so on). In addition, user terminal parameterization values associated with load management or load sharing functionality described herein can be conveyed to user terminals 604A over the wireless link directly from RAN base station 602A.

FIG. 6B depicts a system 600B for load management in an alternative aspect. System 600B depicts a set of wireless network cells 602B. Network cells 602B are communicatively coupled with a RNC 604B via a wired interface. The wired interface can be a core network interface, such as a standardized communication path between base stations and RNC 604B. Particularly, wired interface can comply with various industry standards implemented for network cells 602B and RNC 604B. Access control component 606B is physically separate from, but communicatively coupled with RAN 604B. In this implementation, access control component 606B can be a standardized entity, a custom network operator's equipment, or a third party entity configured to communicate with and coordinate with RNC 604B for load management and load sharing according to the various aspects described herein.

FIG. 6C depicts a block diagram of an example system 600C for load management in yet another alternative aspect. System 600C comprises a RNC 602C. RNC 602C can be substantially similar to RNC 604B, and conforms to typical communication standards for a given wireless technology governing RNC 602C. Additionally, RNC 602C can be configured to include an access control component 606B for providing load management and load sharing functionality described herein. Accordingly, cell load level data received at RNC 602C is processed by access control component 606B, and load management/sharing parameters configured to adjust user terminal cell selection determinations are output by RNC 602C, and distributed to respective network cells controlled by RNC 602C.

The aforementioned systems have been described with respect to interaction between several components and/or communication interfaces. It should be appreciated that such systems and components can include those components or sub-components specified therein, some of the specified components or sub-components, and/or additional components. For example, a system could include access control component 102, communication bus/interface 104, RAN base station 302 and user terminals 304, or a different combination of these or other entities. Sub-components could also be implemented as modules communicatively coupled to other modules rather than included within parent modules. Additionally, it should be noted that one or more components could be combined into a single component providing aggregate functionality. For instance, correction component 514 can include monitoring component 516, or vice versa, to facilitate identifying changes in load levels of cells of a wireless network and updating access terminal parameterization based on such changes, by way of a single component. The components can also interact with one or more other components not specifically described herein but known by those of skill in the art.

Figure 7:
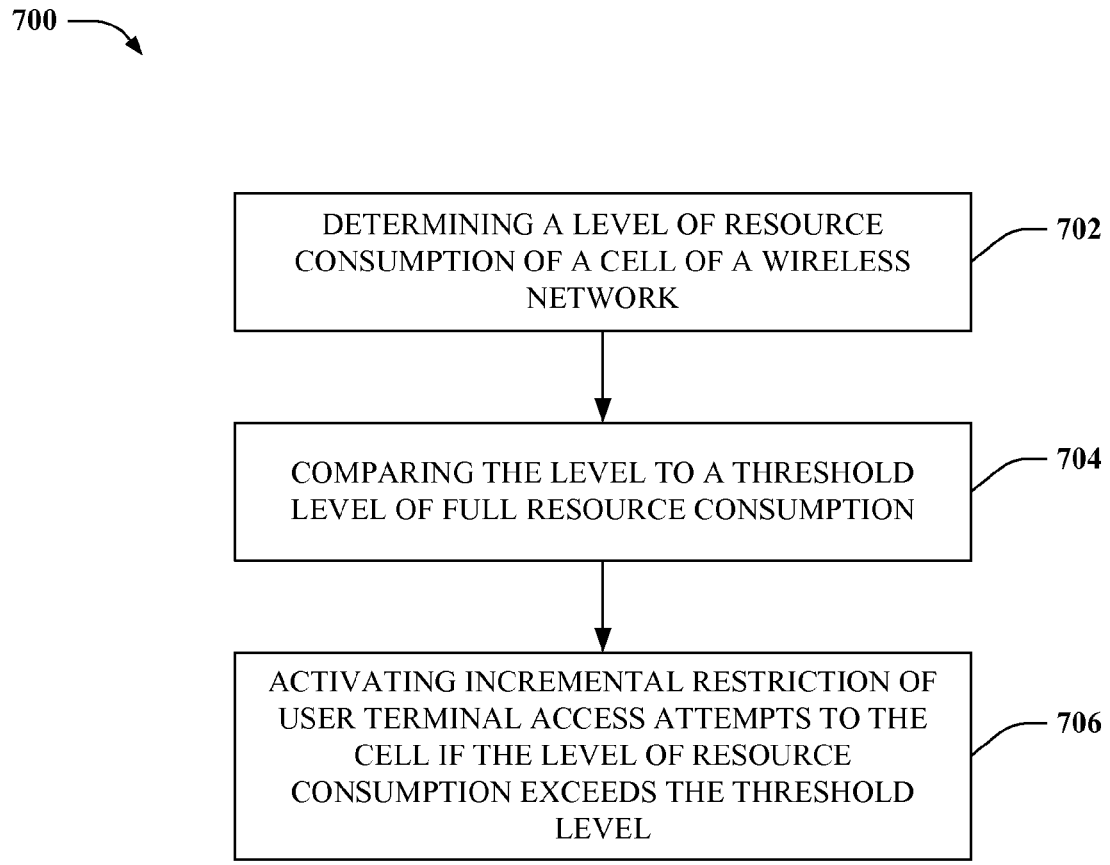
FIG. 7 depicts a flowchart of a sample method for providing dynamic access control in wireless communication according to further aspects.
Figure 8:
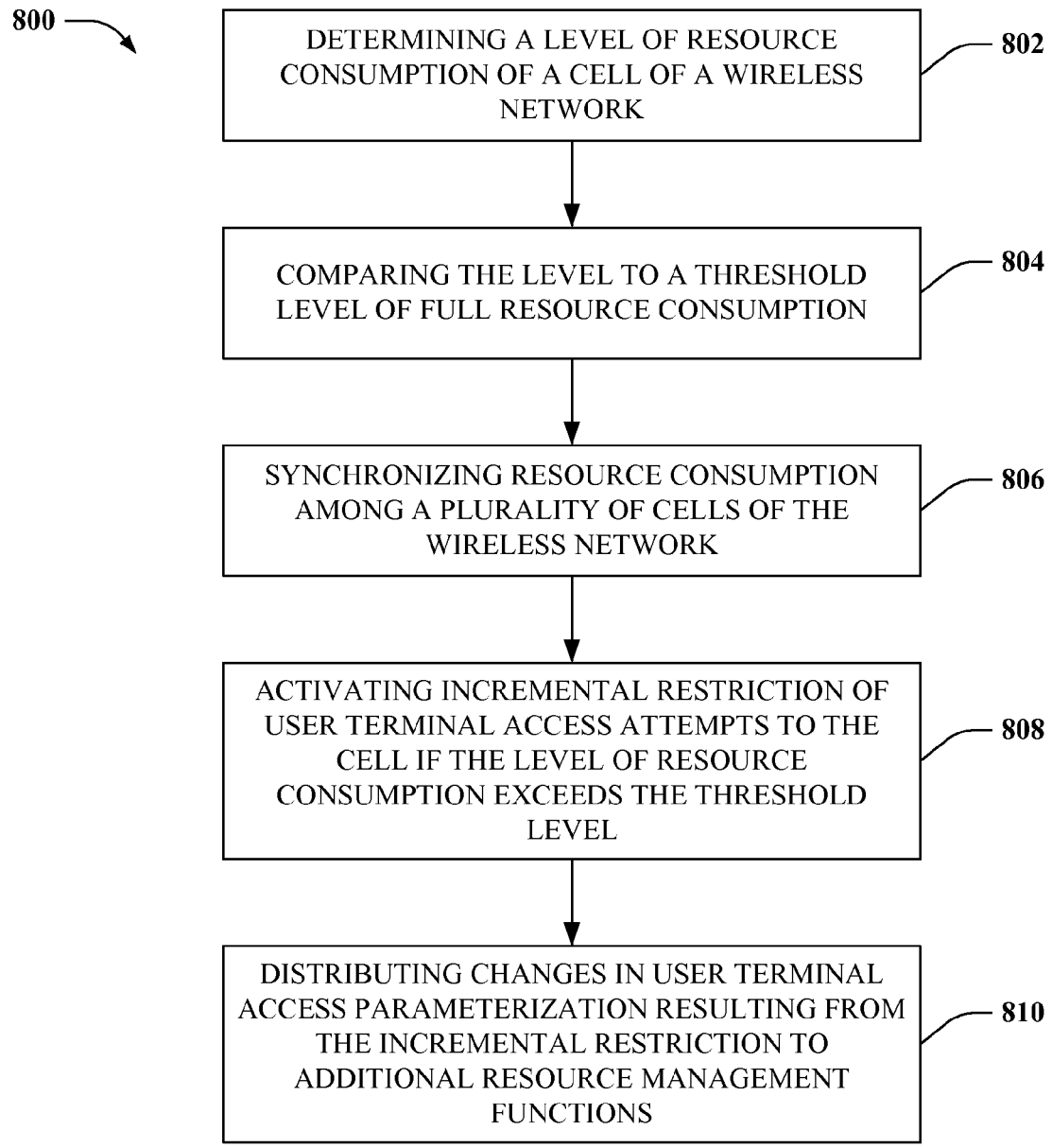
FIG. 8 illustrates a flowchart of an example method for providing inter-cell resource management for load balancing in a wireless network.
Figure 9:
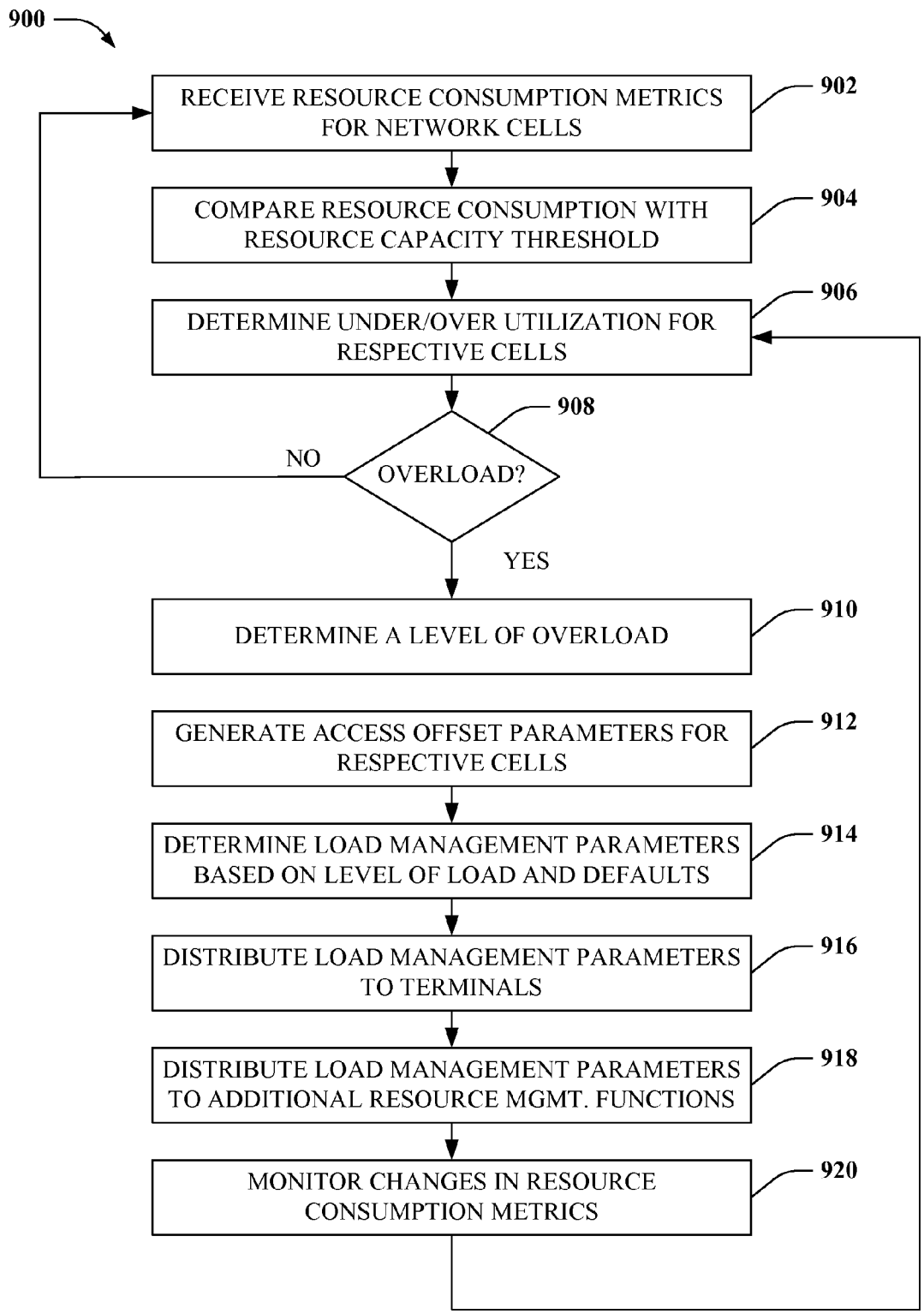
FIG. 9 depicts a flowchart of a sample method for providing inter-cell resource management in conjunction with load management for high terminal density.

FIGS. 7, 8, and 9 illustrate various methods in accordance with one or more of the various embodiments disclosed herein. While, for purposes of simplicity of explanation, the methods are shown and described as a series of acts, it is to be understood and appreciated that the various embodiments are not limited by the order of acts, as some acts may occur in different orders and/or concurrently with other acts from that shown and described herein. For example, those skilled in the art will understand and appreciate that a method could alternatively be represented as a series of interrelated states or events, such as in a state diagram. Moreover, not all illustrated acts may be required to implement a method in accordance with the various embodiments. Additionally, it should be further appreciated that the methods disclosed hereinafter and throughout this specification are capable of being stored on an article of manufacture to facilitate transporting and transferring such methods to computers. The term article of manufacture, as used herein, is intended to encompass a computer program accessible from any computer-readable device, carrier, or media.

FIG. 7 depicts a flowchart of an example method 700 according to additional aspects of the subject disclosure. At 702, method 700 can comprise determining a level of resource consumption for a cell of a wireless network. The level of resource consumption can be deterministic or inferred based on a probability. Where deterministic, a level of loading can be compared with one or more load thresholds, and a determination based on the comparison. Where inferred, the level of loading can be analyzed with respect to predictive algorithms configured to provide probabilities of change in loading based on current network conditions and suitable aggregates of past or modeled network conditions. At 704, method 700 can comprise comparing the level to a threshold level of full resource consumption. In one instance, the threshold level of full resource consumption is a parameter established by a network operator and stored in a data store. In other instances, the threshold level of full resource consumption can comprise various levels of resource consumption associated with respective states of relative loading, including under-loading, moderate loading, and over-loading.

At 706, method 700 can comprise activating incremental restriction on user terminal access attempts to the cell if the level of resource consumption exceeds the threshold level. The incremental restriction can be implemented via one or more parameter values employed by user terminals in idle mode cell selection, in some aspects. These parameters can include signal strength parameters, signal quality parameters, cell bias parameters, network bias parameters (e.g., IRAT parameters), or the like, or suitable combinations thereof.

FIG. 8 illustrates a flowchart of an example method 800 according to still other aspects of the subject disclosure. At 802, method 800 can comprise determining a level of resource consumption for a cell of a wireless network. At 804, method 800 can comprise comparing the level to one or more threshold levels of full resource consumption. Additionally, at 806, method 800 can comprise synchronizing resource consumption among a plurality of cells of the wireless network. Resource consumption synchronization can be implemented, for instance, by identifying respective load levels of the plurality of cells, and providing a load level ranking for respective cells. The load level ranking can be employed to generate cell offload or bias parameters that increase a likelihood that user terminal cell selection determinations will choose a cell with a relatively low level of current load. At 808, method 800 can comprise activating incremental restriction of user terminal access attempts to the cell if the level of resource consumption exceeds the threshold level(s). At 810, method 800 can comprise distributing changes in user terminal access parameterization resulting from the incremental restriction to additional resource management functions of a wireless network.

FIG. 9 depicts a flowchart of a sample method 900 according to yet other aspects of the subject disclosure. At 902, method 900 can comprise receiving resource consumption metrics for respective cells of a wireless network. At 904, method 900 can comprise comparing respective resource consumption levels with one or more resource capacity thresholds for the cells. At 906, method 900 can comprise determining an under or over utilization ranking for respective cells based on the comparison.

At 908, method 900 can make a determination as to whether an overload condition or a potential overload condition exists with respect to one or more of the cells, as described herein. If such condition is determined, method 900 can proceed to 910. Otherwise, method 900 returns to 902.

At 910, method 900 can determine a level of loading for the cell(s) for which the overload condition or potential overload condition exists. At 912, method 900 can comprise generating and distributing offset parameters for respective cells based on the under or over utilization ranking determined at reference number 906.

At 914, method 900 can comprise determining load management parameters for the cell(s) based on level of loading and defaults, and optionally based on the under or over utilization ranking for respective cells. At 916, method 900 can comprise distributing load management parameter values to respective cells, for distribution to user terminals within such cells. At 918, method 900 can comprise distributing load management parameters to additional resource management functions of the wireless network, e.g., to coordinate resource loading functionality for idle mode and active mode terminals. At 920, method 900 can comprise monitoring changes in resource consumption metrics of respective cells. From 920, method 900 can proceed to reference number 906.

Figure 10:
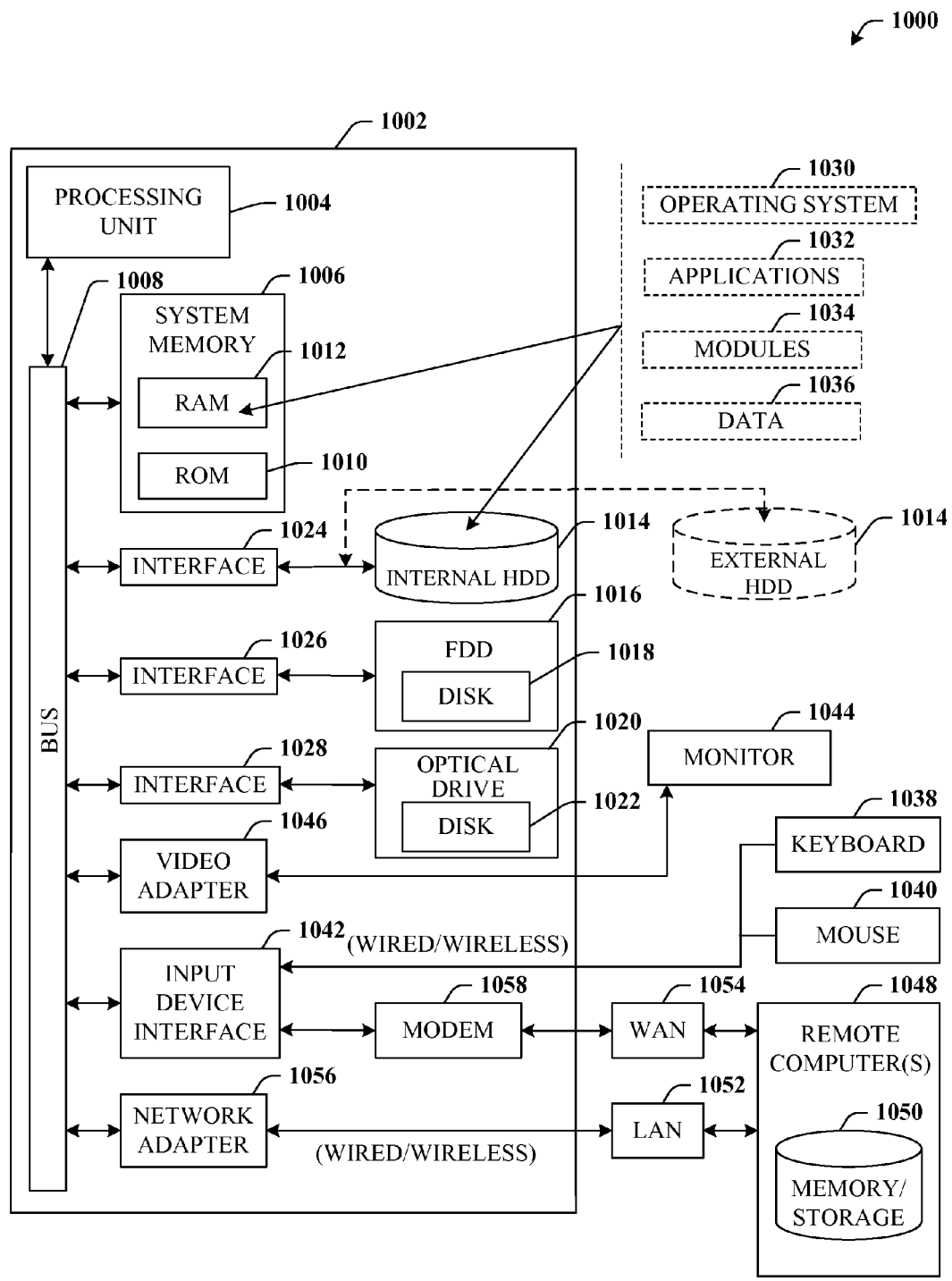
FIG. 10 illustrates a block diagram of an example computer operable to execute at least some aspects of the disclosed subject matter.

Referring now to FIG. 10, there is illustrated a block diagram of an exemplary computer system operable to execute the disclosed architecture. In order to provide additional context for various aspects of the various embodiments, FIG. 10 and the following discussion are intended to provide a brief, general description of a suitable computing environment 1000 in which the various aspects of the various embodiments can be implemented. Additionally, while the various embodiments described above may be suitable for application in the general context of computer-executable instructions that may run on one or more computers, those skilled in the art will recognize that the various embodiments also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the various embodiments may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media can include both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Continuing to reference FIG. 10, the exemplary environment 1000 for implementing various aspects of one or more of the various embodiments includes a computer 1002, the computer 1002 including a processing unit 1004, a system memory 1006 and a system bus 1008. The system bus 1008 couples to system components including, but not limited to, the system memory 1006 to the processing unit 1004. The processing unit 1004 can be any of various commercially available processors. Dual microprocessors and other multiprocessor architectures may also be employed as the processing unit 1004.

The system bus 1008 can be any of several types of bus structure that may further interconnect to a memory bus (with or without a memory controller), a peripheral bus, and a local bus using any of a variety of commercially available bus architectures. The system memory 1006 includes read-only memory (ROM) 1010 and random access memory (RAM) 1012. A basic input/output system (BIOS) is stored in a non-volatile memory 1010 such as ROM, EPROM, EEPROM, which BIOS contains the basic routines that help to transfer information between elements within the computer 1002, such as during start-up. The RAM 1012 can also include a high-speed RAM such as static RAM for caching data.

The computer 1002 further includes an internal hard disk drive (HDD) 1014 (e.g., EIDE, SATA), which internal hard disk drive 1014 may also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE1394 interface technologies. Other external drive connection technologies are within contemplation of the subject matter claimed herein.

The drives and their associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the various embodiments.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is appreciated that the various embodiments can be implemented with various commercially available or proprietary operating systems or combinations of operating systems.

A user can enter commands and information into the computer 1002 through one or more wired/wireless input devices, e.g., a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE1394 serial port, a game port, a USB port, an IR interface, etc.

A monitor 1044 or other type of display device is also connected to the system bus 1008 via an interface, such as a video adapter 1046. In addition to the monitor 1044, a computer typically includes other peripheral output devices (not shown), such as speakers, printers, etc.

The computer 1002 may operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which may connect to a global communications network, e.g., the Internet.

When used in a LAN networking environment, the computer 1002 is connected to the local network 1052 through a wired and/or wireless communication network interface or adapter 1056. The adapter 1056 may facilitate wired or wireless communication to the LAN 1052, which may also include a wireless access point disposed thereon for communicating with the wireless adapter 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 via the serial port interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 11:
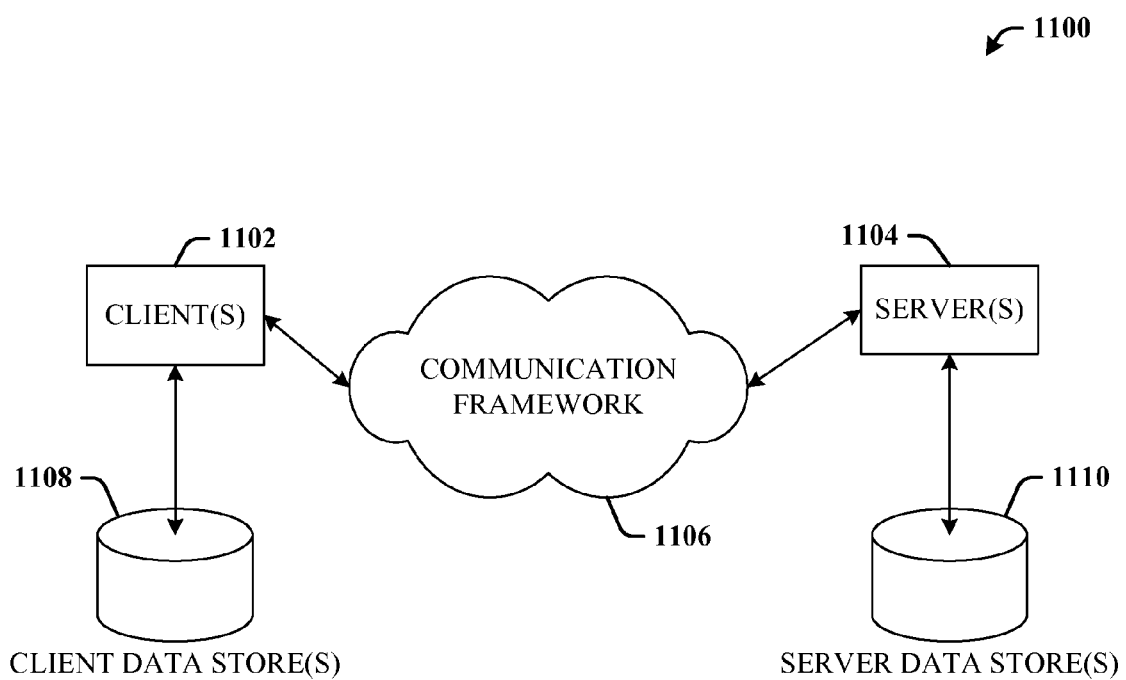
FIG. 11 illustrates a block diagram of an exemplary computing environment according to particular aspects.

Referring now to FIG. 11, there is illustrated a schematic block diagram of an exemplary computer compilation system operable to execute the disclosed architecture. The system 1100 includes one or more client(s) 1102. The client(s) 1102 can be hardware and/or software (e.g., threads, processes, computing devices). The client(s) 1102 can house cookie(s) and/or associated contextual information by employing the various embodiments, for example.

The system 1100 also includes one or more server(s) 1104. The server(s) 1104 can also be hardware and/or software (e.g., threads, processes, computing devices). The servers 1104 can house threads to perform transformations by employing the various embodiments, for example. One possible communication between a client 1102 and a server 1104 can be in the form of a data packet adapted to be transmitted between two or more computer processes. The data packet may include a cookie and/or associated contextual information, for example. The system 1100 includes a communication framework 1106 (e.g., a global communication network such as the Internet) that can be employed to facilitate communications between the client(s) 1102 and the server(s) 1104.

Communications can be facilitated via a wired (including optical fiber) and/or wireless technology. The client(s) 1102 are operatively connected to one or more client data store(s) 1108 that can be employed to store information local to the client(s) 1102 (e.g., cookie(s) and/or associated contextual information). Similarly, the server(s) 1104 are operatively connected to one or more server data store(s) 1110 that can be employed to store information local to the servers 1104.

What has been described above includes examples of the various embodiments. It is, of course, not possible to describe every conceivable combination of components or methods for purposes of describing the embodiments, but one of ordinary skill in the art may recognize that many further combinations and permutations are possible. Accordingly, the detailed description is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments includes a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system, comprising:
a processor; and
a memory that stores executable instructions that, when executed by the processor, facilitate performance of operations, comprising:
comparing a level of resource consumption of a cell device of a wireless network to a threshold of resource consumption;
determining that an overload condition exists with respect to resource consumption of the cell device in response to a result of the comparing indicating that the level of resource consumption exceeds the threshold; and
in response to the determining that the overload condition exists,
determining a level of overloading associated with the level of resource consumption;

generating a first cell access parameter for the cell device based on the level of overloading, wherein the first cell access parameter restricts user terminal access to the cell device resulting in a first access restriction;

sending a first instruction to a user terminal associated with the cell device to update a user terminal access parameter according to the first cell access parameter resulting in a first updated user terminal access parameter, wherein the first instruction causes the user terminal to attempt cell selection of the cell device according to the first cell access parameter;

monitoring the level of overloading; and in response to an increase in the level of overloading being determined in response to the monitoring, generating a second cell access parameter for the cell device based on an increment in the level of overloading, wherein the second cell access parameter restricts the user terminal access to the cell device resulting in a second access restriction greater than the first access restriction; and sending a second instruction to the user terminal to update the first updated user terminal access parameter according to the second cell access parameter resulting in a second updated user terminal access parameter, wherein the first instruction causes the user terminal to attempt the cell selection of the cell device according to the first cell access parameter.

2. The system of claim 1, wherein the operations further comprise:

in response to a decrease in the level of overloading being determined in response to the monitoring, generating a third cell access parameter for the cell device based on a decrement in the level of overloading, wherein the third cell access parameter aids terminal access to the cell device; and sending a third instruction to the user terminal to update the second updated user terminal access parameter according to the third cell access parameter, wherein the first instruction cause the user terminal to attempt the cell selection of the cell device according to the first cell access parameter.

3. The system of claim 1, wherein the operations further comprise initiating dynamic access control for the cell device in response to the determining that the overload condition exists, prior to determining the level of overloading, and wherein the dynamic access control comprises progressive restriction of cell access parameters associated with the user terminal.

4. The system of claim 3, wherein the operations further comprise terminating the dynamic access control for the cell device in response to an outcome of the monitoring the level of overloading being that a current level of overloading is below a second threshold of resource consumption.

5. The system of claim 1, wherein the monitoring the level of overloading comprises determining a metric representative of a current load of the cell device based on first data representative of a number of user terminals served by the cell device, second data representative of an interference level associated with the cell device, or third data representative of a signal resource associated with the cell device.

6. The system of claim 1, wherein the operations further comprise:

distributing the first cell access parameter or the second cell access parameter to a resource management function device of the wireless network.

7. The system of claim 1, wherein the first cell access parameter or the second cell access parameter comprises:

a minimum quality parameter that establishes a minimum signal quality below which the user terminal refrains from attempting the access to the cell device;

a minimum signal strength parameter that establishes a minimum signal strength below which the user terminal refrains from attempting the access to the cell device;

an offset parameter that biases the user terminal with respect to attempting the access to the cell device; or an inter radio access technology offset parameter that biases the user terminal with respect to attempting the access to the cell device based on a wireless technology utilized by the cell device.

8. The system of claim 1, wherein the operations are performed by:

a radio network control point device of a radio access network, a base station device of the radio access network, or a network device communicatively coupled with and physically separate from the radio network control point device or the base station device.

9. The system of claim 1, wherein the operation further comprise:

synchronizing resource consumption among cell devices of the wireless network; and implementing incremental restriction of user terminal access attempts according to a configuration that balances loading among the cell devices.

10. A method, comprising:

comparing, by a system comprising a processor, a level of resource consumption of a cell device of a wireless network to a threshold of resource consumption;

determining, by the system, that an overload condition exists with respect to resource consumption of the cell device in response to a result of the comparing indicating that the level of consumption exceeds the threshold; and in response to determining that the overload condition exists, determining, by the system, a level of overloading associated with the level of resource consumption;

generating, by the system, a first cell access parameter for the cell device based on the level of overloading, wherein the first cell access parameter restricts user terminal access to the cell device resulting in a first access restriction;

sending, by the system, a first instruction to a user terminal associated with the cell device to update a user terminal access parameter according to the first cell access parameter resulting in a first updated user terminal access parameter, wherein the first instruction causes the user terminal to attempt cell selection of the cell device according to the first cell access parameter;

monitoring, by the system, the level of overloading; and in response to an increase in the level of overloading being determined in response to the monitoring, generating, by the system, a second cell access parameter for the cell device based on an increment in the level of overloading, wherein the second cell access parameter restricts user terminal access to the cell device resulting in a second access restriction greater than the first access restriction; and sending, by the system, a second instruction to the user terminal to update the first updated user terminal access parameter according to the second cell access parameter resulting in a second updated user terminal access parameter, wherein the first instruction causes the user terminal to attempt the cell selection of the cell device according to the first cell access parameter.

11. The method of claim 10, further comprising:
in response to a decrease in the level of overloading being determined in response to the monitoring, generating, by the system, a third cell access parameter for the cell device based on a decrement in the level of overloading, wherein the third cell access parameter aids terminal access to the cell device; and
sending, by the system, a third instruction to the user terminal to update the second updated user terminal access parameter according to the third cell access parameter, wherein the first instruction cause the user terminal to attempt the cell selection of the cell device according to the first cell access parameter.

12. The method of claim 10, further comprising:
initiating, by the system, dynamic access control to the cell device in response to determining that the overload condition exists, prior to the determining the level of overloading.

13. The method of claim 12, further comprising:
terminating, by the system, the dynamic access control to the cell device in response to an outcome of the monitoring the level of overloading determining that a current level of overloading is below a second threshold of resource consumption.

14. The method of claim 10, wherein the monitoring the level of overloading comprises determining a metric representative of a current load of the cell device based on first data representative of a number of user terminals served by the cell device, second data representative of an interference level associated with the cell device, or third data representative of a signal resource associated with the cell device.

15. The method of claim 10, further comprising:
synchronizing, by the system, resource consumption among cell devices of the wireless network; and
implementing, by the system, incremental restriction of user terminal access attempts according to a configuration that balances loading among the cell devices.

16. A non-transitory machine-readable storage medium comprising executable instructions that, when executed by a processor facilitate performance of operations, comprising:
comparing a level of resource consumption of a cell device of a wireless network to a threshold of resource consumption;
in response to a result of the comparing indicating that the level of resource consumption exceeds the threshold, determining that an overload condition exists with respect to resource consumption of the cell device; and
in response to determining that the overload condition exists,
initiating dynamic cell selection based on progressive adjustment of cell access parameters of a user terminal associated with the cell device;
determining a level of overloading associated with the level of resource consumption;
generating a first cell access parameter for the cell device based on the level of overloading, wherein the first cell access parameter restricts user terminal access to the cell device resulting in a first access restriction;
sending a first instruction to the user terminal to update a user terminal access parameter according to the first cell access parameter resulting in a first updated user terminal access parameter, wherein the first instruction causes the user terminal to attempt cell selection of the cell device according to the first cell access parameter;
monitoring the level of overloading; and
in response to an increase in the level of overloading being determined in response to the monitoring,
generating a second cell access parameter for the cell device based on an increment in the level of overloading, wherein the second cell access parameter restricts the user terminal access to the cell device resulting in a second access restriction greater than the first access restriction; and
sending a second instruction to the user terminal to update the first updated user terminal access parameter according to the second cell access parameter resulting in a second updated user terminal access parameter, wherein the first instruction causes the user terminal to attempt the cell selection of the cell device according to the first cell access parameter.

17. The non-transitory machine-readable storage medium of claim 16, wherein the operations further comprise:
terminating the dynamic cell selection in response to an outcome of the monitoring the level of overloading determining that a current level of overloading is below the threshold of resource consumption.

18. The non-transitory machine-readable storage medium of claim 16, wherein the monitoring the level of overloading comprises determining a metric representative of a current load of the cell device based on data representative of a combination of a number of user terminals served by the cell device and an interference level associated with the cell device.

19. The non-transitory machine-readable storage medium of claim 16, wherein the operations further comprise:
sending the cell access parameter to resource management function devices of the wireless network, to coordinate the dynamic cell selection based on progressive adjustment of cell access parameters among the resource management function devices.

20. The non-transitory machine-readable storage medium of claim 16, wherein the operations further comprise:
synchronizing resource consumption among cell devices of the wireless network; and
implementing the dynamic cell selection based on progressive adjustment of cell access parameters according to a configuration that balances loading among the cell devices.

* * * * *